Jan. 21, 1930.  T. C. LORENZEN  1,744,654
TRUCK ATTACHMENT FOR SLEDS
Filed Aug. 18, 1928
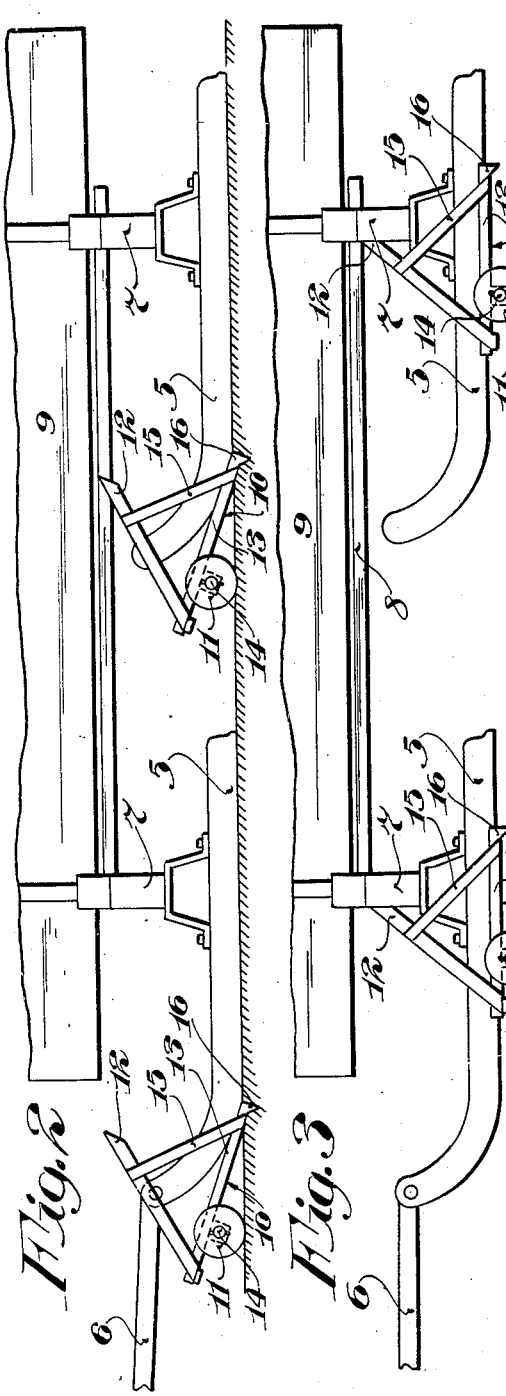
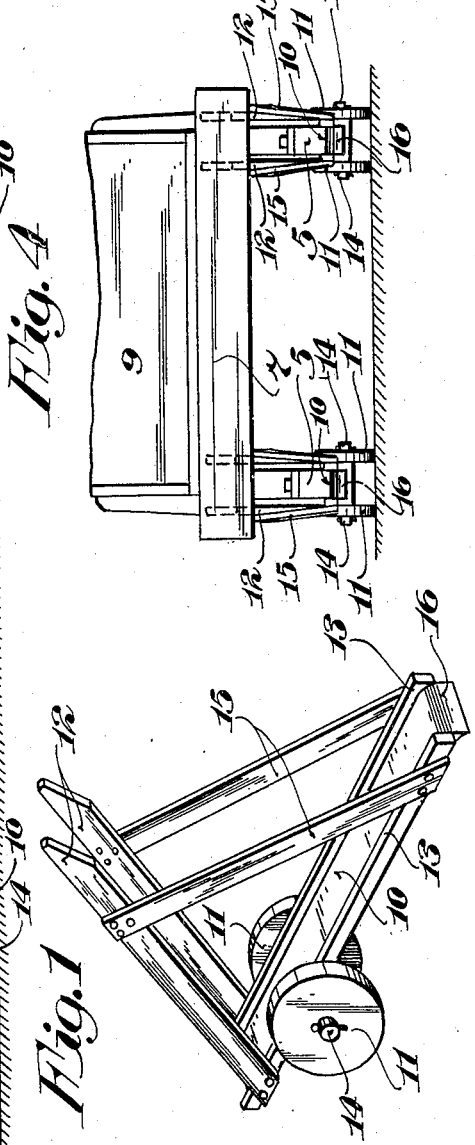
Inventor
Thomas C. Lorenzen
By his Attorneys Patented Jan. 21, 1930

1,744,654

UNITED STATES PATENT OFFICE

THOMAS C. LORENZEN, OF SAVAGE, MONTANA, ASSIGNOR TO THE CUTHBERT CO., OF MINNEAPOLIS, MINNESOTA, A CORPORATION OF MINNESOTA

TRUCK ATTACHMENT FOR SLEDS

Application filed August 18, 1928. Serial No. 300,603.

My invention has for its object the provision of a simple and highly efficient truck attachment for a sleigh or sled runner for use in temporarily supporting such a runner for carrying the same over a bare spot in a road or driveway from which the snow has been removed.

The invention while intended for general use is especially well adapted for use in connection with bobsleds used in conveying heavy loads of grain to an elevator or other storage structure. Grain buyers operating in parts of the country where grain is conveyed on bobsleds in the winter time when snow is on the ground, experience considerable difficulty in getting the heavy loads over driveways or approaches leading to the dumping platforms as the buyers prefer to keep the same clear from snow for the sake of convenience and appearance, and particularly for the reason that in case some of the grain is spilled and mixed with snow, the grade thereof is lowered. In cases where the driveway and approaches are kept clear of snow, it is often necessary to throw loose snow thereon under the runners of a bobsled in order to move a heavy load and while this is satisfactory to the hauler, it is unsatisfactory to the buyer.

By the use of this truck a set of four may be carried on a bobsled or preferably kept at an elevator and when a farmer arrives with a load of grain, he stops his team just before driving on to the approach to the elevator and places one of the trucks in front of each of the four runners of the bobsled. He then drives ahead and the runners mount the trucks and lift the bobsled from the road and support the same on the trucks. With the bobsled mounted on the trucks, the same may be easily moved over the bare approach to the dumping platform. While the grain is being unloaded, the trucks may be removed from the bobsled and used again upon the arrival of the next load.

To the above end, generally stated, the invention consists of the novel devices and combinations of devices hereinafter described and defined in the claims.

In the accompanying drawings which illustrate the invention, like characters indicate like parts throughout the several views:

Referring to the drawings:

Fig. 1 is a perspective view of one of the trucks;

Fig. 2 is a fragmentary side elevation of a bobsled and a set of the trucks placed in front of the runners of the bobsled to be mounted thereby;

Fig. 3 is a view corresponding to Fig. 2 with the exception that the bobsled is mounted on the trucks; and Fig. 4 is a rear end elevation of the parts shown in Fig. 3.

Of the parts of the bobsled illustrated it is only necessary to note the front and rear sleds 5, pole 6, front and rear bolsters 7, reach 8, and box 9.

The improved truck includes a track section 10, a pair of axially spaced wheels 11 and a pair of laterally spaced rearwardly and upwardly inclined stop arms 12. Said track section 10 is, as shown, channel shape in cross-section and the sides thereof afford retaining flanges 13. The wheels 11 are journaled on a pair of axially aligned trunnions 14 with the track section 10 extending longitudinally therebetween. The stop arms 12 at their lower or front ends, are rigidly secured to the retaining flanges 13 and a pair of oblique brace bars 15 rigidly connect the stop arms 12 near their upper ends to said flanges near their rear ends.

On the rear end of the track section 10 is a wide transversely and downwardly extended ground engaging spur 16. The wheels 11 are journaled on the track section 10 forward of the center of gravity so that the track section 10 is normally rearwardly and downwardly inclined with the spur 16 resting on the ground as shown in Figs. 1 and 2. The distance between the retaining flanges 13 is such as to receive a runner therebetween and at the same time hold the truck against angularly returning movements in respect to the runner.

To mount the bobsled on a set of four trucks, said trucks are placed on the ground one in front of each of the upwardly curved ends of the runners of the sleds 5. During the initial forward movement of the bobsled, the curved front ends of its runners pass over the rearwardly inclined track sections 10 between the retaining flanges 13, brace bars 15 and stop bars 12. Further movement of the runners of the bobsled will cause the same to engage the track sections 10 and press the spurs 16 into the road and thereby hold the trucks against movement with said runners. With the trucks thus held, the runners will mount the same and be lifted thereby from the road. When the runners of the bobsled have moved onto the track sections 10 a distance which positions the wheels 11 at substantially the longitudinal center of the runners, the upper ends of the stop bars 12 will be engaged by the front faces of the front bolsters 7 and thereby move the track sections 10 about the axes of their wheels 11 and lift the rear ends of said track sections and their spurs 16 from the road as shown in Fig. 3. The engagement of the stop bars 12 with the front bolster 7 will cause the trucks to move with the bobsled and thereby convey the same on the wheels 11 to the dumping platform. While the load is being removed from the bobsled, the trucks may be removed from the runners of the sleds 5.

What I claim is:

1. A device of the class described comprising a track section, and a wheel journaled on the track section forward of the center of gravity whereby the track section is normally rearwardly and downwardly inclined with its rear end resting on the road and in position to be mounted by a sled runner and to support the same.

2. The structure defined in claim 1 in which the track section is provided with a spur arranged to be pressed into the road by the movement of the runner on the track section to hold the track section against movement with the runner.

3. A device of the class described comprising a track section, a wheel journaled on the track section forward of the center of gravity whereby, the track section is normally rearwardly and downwardly inclined with its rear end resting on the road and in position to be mounted by a sled runner and to support the same, said track section having a spur arranged to be pressed into the road by the movement of the runner on the track section to hold the track section against movement with the runner, and a stop member on the track section arranged to be engaged by a part on the sled during the movement of its runner on the track section and move the track section about the axis of its wheel and lift the rear end thereof and its spur from the road and cause the truck to move with the runner.

4. A device of the class described comprising a track section that is channel shape in cross-section, a pair of axially spaced wheels journaled on the track section forward of the center of gravity whereby the track section is normally rearwardly and downwardly inclined with its rear end resting on the road and in position to be mounted by a sled runner and to support the same, said track section having a spur arranged to be pressed into the road by the movement of the runner on the track section to hold the track section against movement with the runner, a pair of rearwardly and upwardly inclined stop arms attached to the track section forward of the wheels, and a pair of brace bars connecting the stop bars to the track section, said stop bars being arranged to be engaged by a part on the sled during the movement of its runner on the track section and move said track section about the axis of its wheels and lift the rear end thereof and its spur from the road and cause the truck to move with the runner.

5. A device of the class described comprising a wheel supported truck section the rear end of which normally rests on the road and arranged to be lifted from the road by a movement of a sled runner to mount the truck section over the rear end thereof.

6. The structure defined claim 5 in further combination with a spur on the rear end of the truck section arranged to be pressed into the road by a movement of the sled runner on the truck section and to hold said section against movement with the runner.

7. The structure defined in claim 5 in which the truck section is provided with a member extending in the path of the sled during the movement of said runner on the truck section to be engaged by a part on the sled to cause the truck section to move with the runner.

In testimony whereof I affix my signature.

THOMAS C. LORENZEN.